US008947364B2

(12) United States Patent (10) Patent No.: US 8,947,364 B2
Feland, III et al. (45) Date of Patent: Feb. 3, 2015

(54) PROXIMITY SENSOR DEVICE AND METHOD WITH ACTIVATION CONFIRMATION

(75) Inventors: John Morgan Feland, III, San Jose, CA (US); Thuy Thanh Bich Le, Santa Clara, CA (US); Mark Andrew Huie, Sunnyvale, CA (US); Torbjorn Hovden, Santa Clara, CA (US); Phillip Frank Acker, Jr., San Mateo, CA (US)

(73) Assignee: Synaptics Incorporated, San Jose, CA (US)

( * ) Notice: Subject to any disclaimer, the term of this patent is extended or adjusted under 35 U.S.C. 154(b) by 2178 days.

(21) Appl. No.: 11/841,474

(22) Filed: Aug. 20, 2007

(65) Prior Publication Data

US 2009/0051660 A1 Feb. 26, 2009

(51) Int. Cl.
*G06F 3/041* (2006.01)
*G06F 3/0488* (2013.01)

(52) U.S. Cl.
CPC .. *G06F 3/04883* (2013.01); *G06F 2203/04808* (2013.01)
USPC .......................................... 345/173; 715/863

(58) Field of Classification Search
USPC ....................................................... 345/173
See application file for complete search history.

(56) References Cited

U.S. PATENT DOCUMENTS

| 5,128,672 | A | 7/1992 | Kaehler |
| 5,825,352 | A | 10/1998 | Bisset et al. |
| 6,037,882 | A | 3/2000 | Levy |
| 6,414,671 | B1 | 7/2002 | Gillespie |
| 7,030,861 | B1 | 4/2006 | Westerman et al. |
| 2002/0015064 | A1* | 2/2002 | Robotham et al. ............ 345/863 |
| 2005/0162402 | A1 | 7/2005 | Watanachote |
| 2006/0026535 | A1* | 2/2006 | Hotelling et al. ............ 715/863 |
| 2006/0238520 | A1 | 10/2006 | Westerman et al. |

OTHER PUBLICATIONS

"FingerWorks Installation and Operation Guide for iGesture Products w/Keys," FingerWorks, Inc., 2002, 10 pgs., http://www.fingerworks.com.
"Quick Reference Guide for iGesture Products," FingerWorks, Inc., 1999-2002, 2 pgs., http://www.fingerworks.com.
"iGesture Pad Installation and Operation," FingerWorks, Inc., 2 pgs, 2002.

(Continued)

*Primary Examiner* — Charles V Hicks
(74) *Attorney, Agent, or Firm* — Ingrassia Fisher & Lorenz P.C.

(57) ABSTRACT

A touch sensor device and method is provided that facilitates improved device usability. Specifically, the touch screen device and method provide user interface functionality while reducing the possibility of inadvertent activation of certain functions. The touch screen device comprises a proximity sensor adapted to detect object presence in a sensing region, a display screen overlapping the sensing region, and a processor. The touch screen device is adapted to provide user interface functionality by facilitating the display of user interface elements and the selection and activation of corresponding functions. For certain functions, the touch screen device and method uses the presence of a second object to confirm selection of a function before that function will be performed. So configured, the touch device screen is able to reduce the likelihood of inadvertent activation for certain functions on the device.

28 Claims, 10 Drawing Sheets

(56) References Cited

OTHER PUBLICATIONS

"Right Hand Gesture/Hotkey Mappings for all TouchStream and iGesture Products," FingerWorks, Inc., 2002, 1 pg., http://www.fingerworks.com.

"Tips and Tricks for using the MultiTouch Surface," FingerWorks, Inc., 1999-2000, 1 pg., http://www.fingerworks.com.

"FingerWorks Installation and Operation Guide for the TouchStream ST & TouchStream LP," FingerWorks, Inc., 2002, 14 pgs., http://www.fingerworks.com.

"Quick Reference Guide for TouchStream ST/LP," FingerWorks, Inc., 1999-2002, http://www.fingerworks.com.

* cited by examiner

PROXIMITY SENSOR DEVICE AND METHOD WITH ACTIVATION CONFIRMATION

FIELD OF THE INVENTION

This invention generally relates to electronic devices, and more specifically relates to proximity sensor devices and using a proximity sensor device for producing user interface inputs.

BACKGROUND OF THE INVENTION

Proximity sensor devices (also commonly called touch pads or touch sensor devices) are widely used in a variety of electronic systems. A proximity sensor device typically includes a sensing region, often demarked by a surface, which uses capacitive, resistive, inductive, optical, acoustic and/or other technology to determine the presence, location and/or motion of one or more fingers, styli, and/or other objects. The proximity sensor device, together with finger(s) and/or other object(s), can be used to provide an input to the electronic system. For example, proximity sensor devices are used as input devices for larger computing systems, such as those found integral within notebook computers or peripheral to desktop computers. Proximity sensor devices are also used in smaller systems, including: handheld systems such as personal digital assistants (PDAs), remote controls, communication systems such as wireless telephones and text messaging systems. Increasingly, proximity sensor devices are used in media systems, such as CD, DVD, MP3, video or other media recorders or players.

One common application for a proximity sensor device is as a touch screen. In a touch screen, the proximity sensor is combined with a display screen for displaying graphical and/or textual elements. Together, the proximity sensor and display screen function as a user interface. In these applications the proximity sensor device can function as a value adjustment device, cursor control device, selection device, scrolling device, graphics/character/handwriting input device, menu navigation device, gaming input device, button input device, keyboard and/or other input device.

One issue with some past proximity sensor devices in general, and touch screens in particular, is that they have been prone to accidental activation. Specifically, because of the low force needed to activate the proximity sensor, a simple brush of the sensor can inadvertently actuate a function on the sensor. In many cases, an inadvertent activation can be merely inconvenient. For example, when parameter such as volume is inadvertently adjusted it may be annoying to the user, but not overly worrisome. However, in other cases, the inadvertent activation can be more problematic. For example, when the inadvertent activation causes applications to be closed improperly, or data to be unintentionally discarded. In these cases, the inadvertent activation can cause serious inconvenience for users.

Thus, there exists a need for improvements in proximity sensor device usability that facilitates the use of touch screens as interface devices while avoiding inadvertent activation of specified functions.

BRIEF SUMMARY OF THE INVENTION

The embodiments of the present invention provide a touch screen device and method that facilitates improved device usability. Specifically, the touch screen device and method provide user interface functionality while reducing the possibility of inadvertent activation of certain functions. The touch screen device comprises a display screen, a processor, and a proximity sensor adapted to detect object presence in a sensing region, where the sensing region overlaps at least a part of the display screen. The touch screen device is adapted to provide user interface functionality by facilitating the display of user interface elements and the selection and activation of corresponding functions. For certain functions, the touch screen device and method uses the presence of a second object to confirm selection of a function before that function will be performed. Specifically, in accordance with the embodiments of the invention, the processor is configured to identify a selected function that corresponds to the location of an identified presence of a first object in the sensing region. The processor is further configured to confirm the selected function responsive to an identified presence of a second object in the sensing region within a specified temporal period of the identified presence of the first object. Thus, the location of a first object identifies a function, and the presence of the second object confirms the selected function. Without the presence of the second object, the activation of the selected function is not confirmed and thus the selected function will not be performed. So configured, the touch device screen is able to reduce the likelihood of inadvertent activation for certain functions on the device. Thus, the system and method provide a touch screen device and method that provides user interface functionality while reducing the possibility of inadvertent activation for certain functions.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
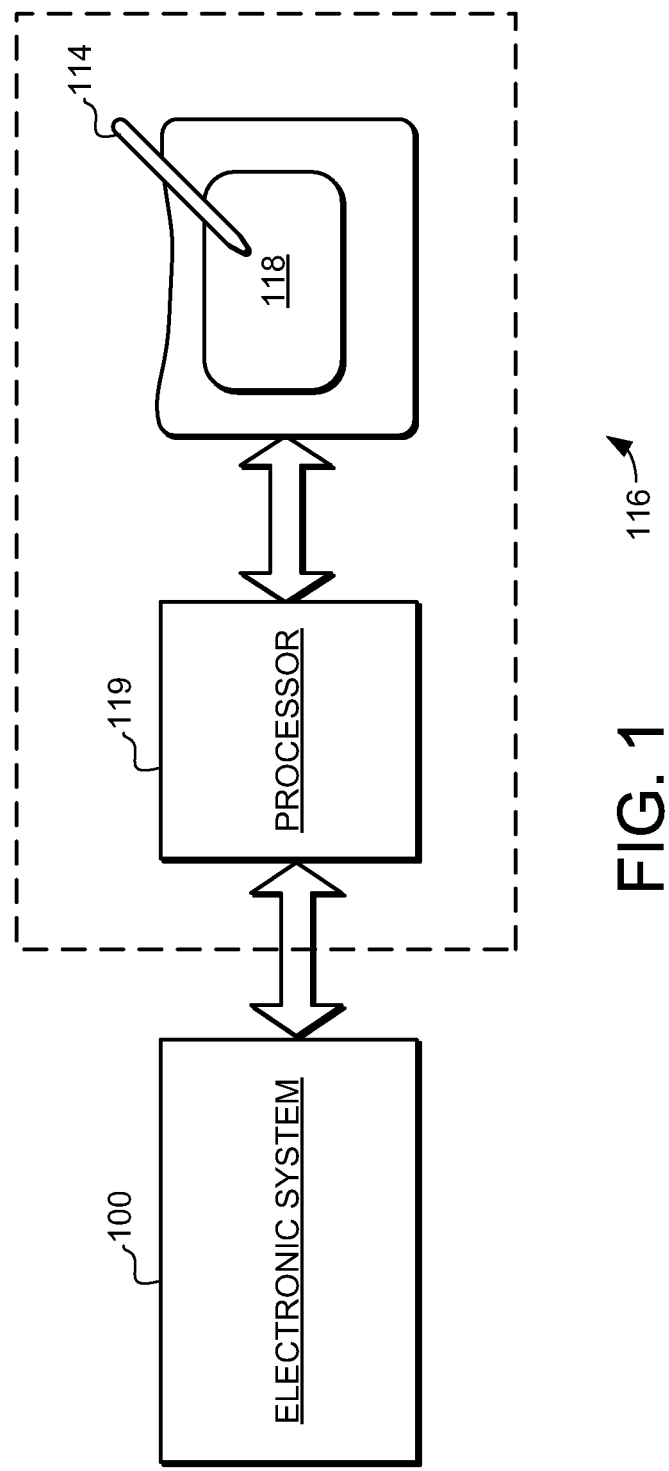
FIG. 1 is a block diagram of an exemplary system that includes a proximity sensor device in accordance with an embodiment of the invention.

The embodiments of the present invention provide a touch screen device and method that facilitates improved device usability. Specifically, the touch screen device and method provide user interface functionality while reducing the possibility of inadvertent activation of certain functions. The touch screen device comprises a proximity sensor device adapted to detect object presence in a sensing region and a display screen overlapped by the sensing region. Turning now to the drawing figures, FIG. 1 is a block diagram of an exemplary electronic system 100 that operates with a touch screen interface 116. As will be discussed in greater detail below, the touch sensing interface 116 includes a proximity sensor device configured as part of a touch screen interface for the electronic system 100. Electronic system 100 is meant to represent any type of personal computer, portable computer, workstation, personal digital assistant, video game player, communication device (including wireless phones and messaging devices), media device, including recorders and players (including televisions, cable boxes, music players, and video players), digital camera, video camera or other device capable of accepting input from a user and of processing information. Accordingly, the various embodiments of system 100 may include any type of processor, memory or display. Additionally, the elements of system 100 may communicate via a bus, network or other wired or wireless interconnection, including I2C, SPI, PS/2, Universal Serial Bus (USB), Bluetooth, RF, IRDA, or any other type of wired or wireless connection to list several non-limiting examples.

A touch screen interface 116 is implemented with a processor 119 and a proximity sensor device having a sensing region 118. The proximity sensor device of touch screen interface 116 is sensitive to positional information, such as the position of a stylus 114, finger and/or other input object within the sensing region 118. "Sensing region" 118 as used herein is intended to broadly encompass any space above, around, in and/or near the proximity sensor device wherein the sensor is able to detect the object. In a conventional embodiment, sensing region 118 extends from the surface of the sensor in one or more directions for a distance into space until signal-to-noise ratios prevent object detection. This distance may be on the order of less than a millimeter, millimeters, centimeters, or more, and may vary significantly with the type of position sensing technology used and the accuracy desired. Other embodiments may require contact with the surface, either with or without applied pressure. Accordingly, the planarity, size, shape and exact locations of the particular sensing regions 118 will vary widely from embodiment to embodiment.

In operation, the proximity sensor device of the touch screen interface 116 suitably detects positional information, such as the position, of stylus 114, a finger, and/or other input object within sensing region 118. Using processor 119, the touch screen interface 116 provides electrical or electronic indicia of the positional information to the electronic system 100. The system 100 appropriately processes the indicia to accept inputs from the user, to move a cursor or other object on a display, or for any other purpose.

The proximity sensor device of the touch screen interface 116 includes a sensor (not shown) that utilizes any combination of sensing technology to implement one or more sensing regions 118. The proximity sensor device can use a variety of techniques for detecting the presence of an object, and includes one or more electrodes or other structures adapted to detect object presence. As several non-limiting examples, the proximity sensor device can use capacitive, resistive, inductive, surface acoustic wave, or optical techniques. These techniques are advantageous to ones requiring moving mechanical structures (e.g. mechanical switches) that more easily wear out over time. In a common capacitive implementation of a touch sensor device a voltage is typically applied to create an electric field across a sensing surface. A capacitive proximity sensor device would then detect positional information about an object by detecting changes in capacitance caused by the changes in the electric field due to the object. Likewise, in a common resistive implementation, a flexible top layer and a rigid bottom layer are separated by insulating elements, and a voltage gradient is created across the layers. Pressing the flexible top layer creates electrical contact between the top layer and bottom layer. The resistive proximity sensor device would then detect positional information about the object by detecting the voltage output due to the relative resistances between driving electrodes at the point of contact of the object. In an inductive implementation, the sensor might pick up loop currents induced by a resonating coil or pair of coils, and use some combination of the magnitude, phase and/or frequency to determine positional information. In all of these cases the proximity sensor device detects the presence of the object and delivers indicia of the detected object to the system 100. For example, the sensor of proximity sensor device can use arrays of capacitive sensor electrodes to support any number of sensing regions 118. As another example, the sensor can use capacitive sensing technology in combination with resistive sensing technology to support the same sensing region 118 or different sensing regions 118. Examples of the type of technologies that can be used to implement the various embodiments of the invention can be found at U.S. Pat. Nos. 5,543,591, 6,259,234 and 5,815,091, each assigned to Synaptics Inc.

The processor 119 is coupled to the touch screen interface 116 and the electronic system 100. In general, the processor 119 receives and processes electrical signals, and communicates with other elements on the system 100. In general, the processor 119 receives electrical signals from the sensor of the proximity sensor device, processes the electrical signals, and communicates with the electronic system 100. The processor 119 can perform a variety of processes on the signals received from the sensor to implement the proximity sensor device of touch screen interface 116. For example, the processor 119 can select or connect individual sensor electrodes, detect presence/proximity, calculate position or motion information, or interpret object motion as gestures. As additional examples, processor 119 can also report positional information constantly, when a threshold is reached, or in response some criterion such as an identified gesture. The processor 119 can report indications to some part of the electronic system 100, cause changes directly to the display of touch screen interface 116, or provide indications directly to one or more users, just to name a few examples. The processor 119 can also determine when certain types or combinations of object motions occur proximate the sensor. For example, the processor 119 can determine the presence and/or location of multiple objects in the sensing region, and can generate the appropriate indication(s) in response to those object presences. In some embodiments the processor 119 can also be adapted to perform other functions in the proximity sensor device of touch screen interface 116.

In this specification, the term "processor" is defined to include one or more processing elements that are adapted to perform the recited operations. Thus, the processor 119 can comprise all or part of one or more integrated circuits, firmware code, and/or software code needed to perform the recited operations. In some embodiments, all elements that comprise the processor 119 would be located together, with or near the sensor and the display of the touch screen interface 116. In other embodiments, these elements would be physically separated, with some elements of the processor 119 close to the sensor, the display, and/or some other portions of the electronic system 100. In this latter embodiment, minimal processing could be performed by the elements near the sensor or the display, and the majority of the processing performed by the other elements elsewhere close to other portions of the electronic system 100.

Furthermore, the processor 119 can communicate with some part of the electronic system 100, and be physically separate from or integral with that part of the electronic system. For example, the processor 119 can reside at least partially on a microprocessor performing functions for the electronic system 100 different from implementing the touch screen interface 116.

Again, as the term is used in this application, the term "electronic system" broadly refers to any type of device that operates with touch screen interface 116. The electronic system 100 could thus comprise any type of device or devices in which a touch screen interface 116 can be implemented in or coupled to. The touch screen interface 116 thus could be implemented as part of the electronic system 100, or coupled to the electronic system 100 using any suitable technique. As non-limiting examples the electronic system 100 could thus comprise any type of computing device, media player, communication device, or another input device (such as another touch sensor device or keypad). In some cases the electronic system 100 is itself a peripheral to a larger system. For example, the electronic system 100 could be a data input or output device, such as a remote control or display device, that communicates with a computer or media system (e.g., remote control for television) using a suitable wired or wireless technique. It should also be noted that the various elements (processor, memory, etc.) of the electronic system 100 could be implemented as part of an overall system, as part of the touch sensor device, or as a combination thereof. Additionally, the electronic system 100 could be a host or a slave to the touch screen interface 116.

In some embodiments the touch screen interface 116 is implemented with buttons or other input devices near the sensing region 118. The buttons can be implemented to provide additional input functionality to the touch screen interface 116. For example, the buttons can be used to facilitate selection of items using the proximity sensor device. Of course, this is just one example of how additional input functionality can be added to the touch screen interface 116, and in other implementations the touch screen interface 116 could include alternate or additional input devices, such as physical or virtual switches, or additional proximity sensing regions. Conversely, the touch screen interface 116 can be implemented with no additional input devices.

Likewise, the positional information determined the processor 119 can be any suitable indicia of object presence. For example, the processor 119 can be implemented to determine "zero-dimensional" 1-bit positional information (e.g. near/far or contact/no contact) or "one-dimensional" positional information as a scalar (e.g. position or motion along a sensing region). Processor 119 can also be implemented to determine multi-dimensional positional information as a combination of values (e.g. two-dimensional horizontal/vertical axes, three-dimensional horizontal/vertical/depth axes, angular/radial axes, or any other combination of axes that span multiple dimensions), and the like. Processor 119 can also be implemented to determine information about time or history.

Furthermore, the term "positional information" as used herein is intended to broadly encompass absolute and relative position-type information, and also other types of spatial-domain information such as velocity, acceleration, and the like, including measurement of motion in one or more directions. Various forms of positional information may also include time history components, as in the case of gesture recognition and the like. As will be described in greater detail below, the positional information from the processor 119 facilitates a full range of interface inputs, including use of the proximity sensor device as a pointing device for cursor control, scrolling, and other functions.

It should be noted that although the various embodiments described herein are referred to as "proximity sensor devices", these terms as used herein are intended to encompass not only conventional proximity sensor devices, but also a broad range of equivalent devices that are capable of detecting the position of a one or more fingers, pointers, styli and/or other objects. Such devices may include, without limitation, touch screens, touch pads, touch tablets, biometric authentication devices, handwriting or character recognition devices, and the like.

As stated above, in the embodiments of the proximity sensor device is adapted as part of a touch screen interface 116. Specifically, the proximity sensor device is combined with a display screen that is overlapped by at least a portion of the sensing region 118. Together the proximity sensor device and the display screen provide a touch screen for interfacing with the electronic system 100. The display screen can be any type of electronic display capable of displaying a visual interface to a user, and can include any type of LED (including organic LED (OLED)), CRT, LCD, plasma, EL or other display technology. When so implemented, the proximity sensor device of touch screen interface 116 can be used activate functions on the electronic system 100, such as by allowing a user to select a function by placing an object in the sensing region proximate an icon or other user interface element that is associated with or otherwise identifies the function. The user's placement of the object can thus identify the function to the electronic system 100. Likewise, the proximity sensor device of touch screen interface 116 can be used to facilitate user interface interactions, such as button functions, scrolling, panning, menu navigation, cursor control, and the like. As another example, the proximity sensor device can be used to facilitate value adjustments, such as by enabling changes to a device parameter. Device parameters can include visual parameters such as color, hue, brightness, and contrast, auditory parameters such as volume, pitch, and intensity, operation parameters such as speed and amplification. In these examples, the proximity sensor device is used to both activate the function and then to perform the adjustment, typically through the use of object motion in the sensing region 118.

It should also be understood that the different parts of the handheld communications device can share physical elements extensively. For example, some display and proximity sensing technologies can utilize the same electrical components for displaying and sensing. One implementation can use an optical sensor array embedded in the TFT structure of LCDs to enable optical proximity sensing through the top glass of the LCDs. Another implementation can use a resistive touch-sensitive mechanical switch into the pixel to enable both display and sensing to be performed by substantially the same structures.

It should also be understood that while the embodiments of the invention are to be described herein the context of a fully functioning touch screen device, the mechanisms of the present invention are capable of being distributed as a program product in a variety of forms. For example, the mechanisms of the present invention can be implemented and distributed as a proximity sensor program on a computer-readable signal bearing media. Additionally, the embodiments of the present invention apply equally regardless of the particular type of computer-readable signal bearing media used to carry out the distribution. Examples of signal bearing media include: recordable media such as memory sticks/cards/modules and disk drives, which may use flash, optical, magnetic, holographic, or any other storage technology.

In the embodiments of the present invention, the touch screen interface 116 is adapted to facilitate improved device usability. Specifically, the touch screen interface 116 provides user interface functionality while reducing the possibility of inadvertent activation of certain functions. The touch screen interface 116 is adapted to provide user interface functionality by facilitating the display of user interface elements and the selection and activation of corresponding functions. For certain functions, the proximity sensor device of touch screen interface 116 uses the presence of a second object to confirm selection of a function before that function will be performed. Specifically, the processor 119 is configured identify a selected function that corresponds to the location of an identified presence of a first object in the sensing region 118. The processor 119 is further configured to confirm the selected function responsive to an identified presence of a second object in the sensing region 118 within a specified temporal period of the identified presence of the first object. Thus, the location of a first object identifies a function, and the presence of the second object confirms the selected function. Without the presence of the second object, the activation of the selected function is not confirmed and thus the selected function will not be performed. So configured, the touch screen interface 116 is able to reduce the likelihood of inadvertent activation for certain functions on the electronic system 100. Thus, the touch screen interface 116 provides user interface functionality while reducing the possibility of inadvertent activation for certain functions.

Figure 2:
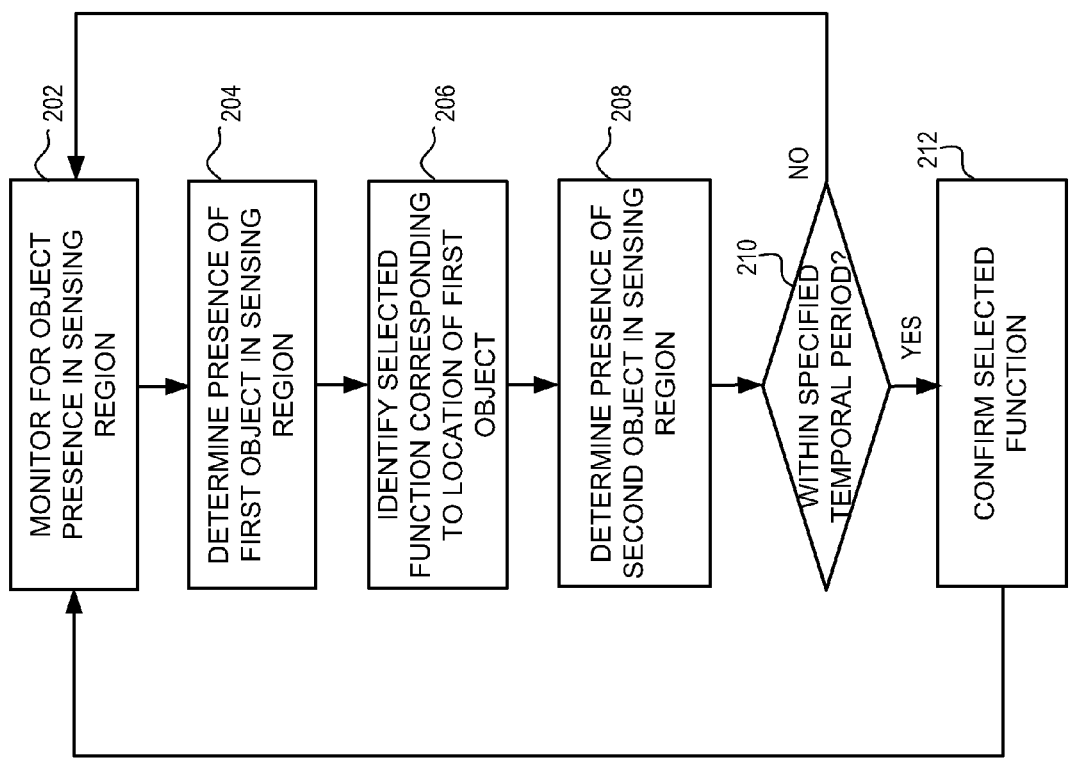
FIG. 2 is a flow diagram of a method for activating a function in accordance with the embodiments of the invention.

Turning now to FIG. 2, a method 200 of activating a function using a touch screen having a proximity sensor device is illustrated. The method facilitates improved device usability by providing user interface functionality while reducing the possibility of inadvertent activation of certain functions. The first step 202 is to monitor for object presence in the sensing region of a proximity sensor device. Again, the proximity sensor device can comprise any type of suitable device, using any type of suitable sensing technology. Typically, the step of monitoring for object presence would be performed continuously, with the proximity sensor device continuously monitoring for object presence whenever it is enabled.

The next step 204 is to determine the presence of a first object in the sensing region. Thus, when an object is moved into the sensing region, the proximity sensor device is able to detect the presence of that object and determine positional information that is indicative of the object's position in the sensing region. That positional information can then be used in step 206 to identify a function that corresponds to the location of the first object. For example, if the first object location corresponds to the location of a button displayed on the touch screen, then the button function is identified as corresponding to the location of the first object. Likewise, if the first object location corresponds to the location of a virtual scroll ring, then the scroll ring function is identified as corresponding to the location of the first object.

It is important to note that in the embodiments of the present invention, the function corresponding to the location is not performed in response to the first object presence. Instead, the embodiments of the invention use the presence of a second object to confirm the selection of the function. Thus, the next step 208 is to determine the presence of a second object in the sensing region. When a second object is moved into the sensing region, the proximity sensor device is again able to detect the presence of the object and determine positional information that is indicative of the object's position in the sensing region. Then, in step 210 it is determined if the second object presence occurred within a specified temporal period of the first object presence. If the presence did not occur within the specified temporal period, the selected function is not confirmed and the method returns to step 202 to continue monitoring for object presences in the sensing region. If the presence did occur within the specified temporal period, the selected function is confirmed in step 212. Thus, the function identified by the presence of the first object is confirmed by the presence of the first object. Only when the presence of both the first object and the second object has been detected within a specified temporal period is the function performed on the electronic system. Without the presence of the second object, the activation of the selected function is not confirmed and thus the selected function will not be performed. So configured, the method 200 reduces the likelihood of inadvertent activation for certain functions on the device.

The method 200 can be implemented to use a variety of different parameters to determine whether the second object presence is identified with a specified temporal period of the first object presence. Typically, it is desirable to require that the second object presence occur within a relatively short period of time of the first presence. Too long a period of time may lead to inadvertent confirmation of a function, while too short a period of time may make confirmation difficult. In one embodiment, the identified presence of the second object must begin both after the identified presence of the first object begins, and before the identified presence of the first object ends. In this embodiment the second object presence begins after the first, and also overlaps in time with the first. In a second embodiment, the identified presence of the first object must begin both after the identified presence of the second object begins, and before the identified presence of the second object ends. In this embodiment the first object presence begins after the second, and also overlaps in time with the second. Thus, the first object presence can occur after the second object presence has begun. Stated another way, the first" in "identified presence of a first object" and "second" in "identified presence of a second object" are thus used for convenience of explanation, and are not meant to imply an a requirement of temporal order. In other embodiments an overlapping presence is not required, instead the second presence is required to begin within a predefined, preferably relatively short, time period after the first presence ends.

It should also be noted that a variety of different techniques can be used to identify a selected function and then confirm the selected function. The specific technique used will typically depend on the details of the system and the function being implemented. For a typical function, the method 200 can be implanted to "identify" a selected function by determining positional information relating to the first object presence and using the positional information to determine what corresponding function is being selected. Likewise, the method 200 can be implemented to "confirm" a function by providing an appropriate response to the system when the presence of the second object has been confirmed. For example, a "send" function can be identified based on positional information from the first object, and then confirmed by sending a command signal to the system that initiates the performance of the send function.

In one embodiment, the processor supporting the touch screen interface includes a touch sensor controller and either or both a display controller and a system controller, where the touch sensor controller, the display controller, and the system controller can all be part of the same physical integrated circuit, or implemented as any number of separate integrated circuits and discrete components. In this embodiment, the touch sensor controller determines the location of the first object presence on the touch screen and provides this information to a system controller. In this embodiment, the system controller runs an operating system and relevant applications, and uses the information provided by the touch sensor controller about the location of first object presence to identify the function associated that position. Further, in this embodiment, the touch sensor controller determines the location of the second object presence on the touch screen and provides some indication of this information to the system controller. The indication can be merely that the second object presence has been sensed, the location of the second object presence, or any other positional information about the second object presence. The system controller responds to the indication provided by confirming the selected function and may perform the selected function immediately or after the occurrence of some other event (e.g. motion of one or both of the first and second object presences).

Typically, the method 200 will not be used for all functions available on the system even though method 200 can be used for all functions. Instead, only certain functions of particular importance will be implemented to require the two object presences to confirm activation of the function. For example, functions where inadvertent activation can lead to significant inconvenience typically would be implemented to require confirmation before the function is performed. Other, less critical functions can be implemented to activate in response to a single object within a defined location in the sensing region. In this case, when the function is identified (e.g., step 206) as one that does not require confirmation for activation, it can be confirmed immediately, without requiring the second object presence within the specified temporal period.

Likewise, the use of two object presences to confirm activation can be limited to certain operational conditions. For example, in a multifunction device that can operate as both a phone and a media player, the device can be configured to require confirmation when acting as phone while not requiring confirmation when acting as a media player.

In all of these cases the method 200 provides user interface functionality while reducing the possibility of inadvertent activation for certain functions.

Turning now to FIGS. 3-8, an exemplary electronic device 300 is illustrated. The exemplary device 300 is a multifunction device that includes both communication and media player capabilities. However, it should be noted that the device 300 is merely exemplary of the type of devices in which the system and method can be implemented. The device 300 includes a touch screen 302. The touch screen 302 comprises a proximity sensor adapted to detect object presences in a sensing region, and a display screen that underlies at least a portion of the sensing region. Again, the technology used to implement the proximity sensor can be any suitable sensing technology, including the capacitive and resistive technologies discussed above. Likewise, the technology used to implement the display screen can be any suitable display technology, including LCD and EL technologies discussed above.

Figure 3:
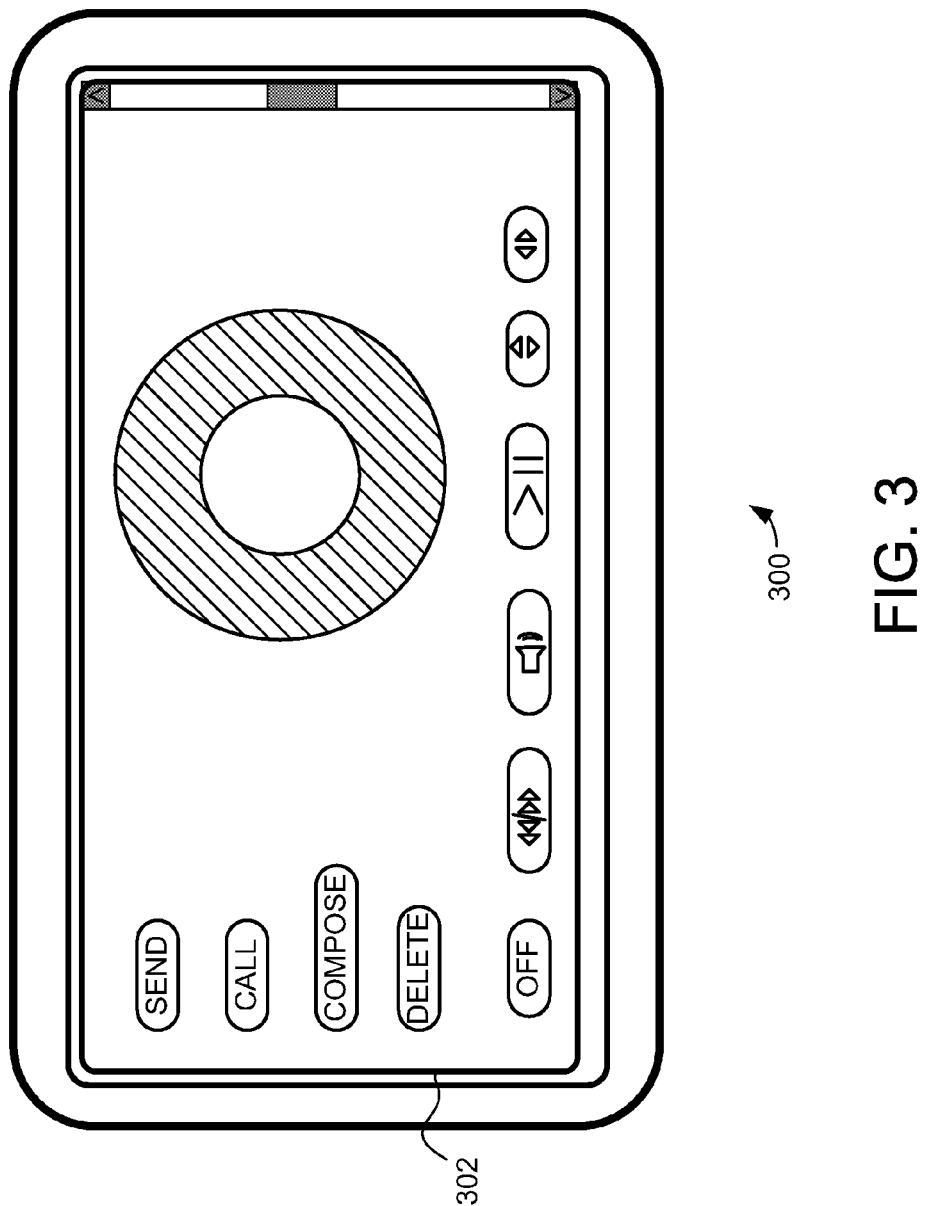
FIG. 3-10 are top views of a electronic device with a touch screen interface in accordance with embodiments of the invention.

Illustrated on the touch screen 302 in FIG. 3 is a plurality of user interface elements. These user interface elements include a variety of button elements used to implement specific functions, an adjustment wheel, and a scroll bar. The button elements shown in FIG. 3 are used to activate button functions, i.e., those functions that can operate with simple binary actions such as on/off, activate/deactivate. The button elements include send, call compose, delete, off, fast forward/reverse, volume, play/pause, scroll up/down and pan left/right. Again, these user interface elements are merely exemplary of the type of elements and type of functions that can be implemented. For example, multi-stage buttons may be used in some interfaces, although that is not shown in FIG. 3. Naturally, the type of user interface elements and their corresponding functions would depend on the type of electronic system being implemented. Thus, a phone would typically include a different set of functions than a remote control.

During operation of the device 300, the touch screen 302 functions as a user interface by displaying to the user and receiving inputs from the user. A user can control the operation of the device 300 by placing and moving on ore more objects in the sensing region, where the proximity sensor will sense the object presence(s) and determine positional information. The device 300 will respond as appropriate, e.g., by performing any functions indicated by sensed object presence. For example, a user can initiate a "call" function by placing an object in the sensing region over the call user interface element. Likewise, a user can adjust a value using the adjustment wheel by moving an object about the wheel.

Figure 4:
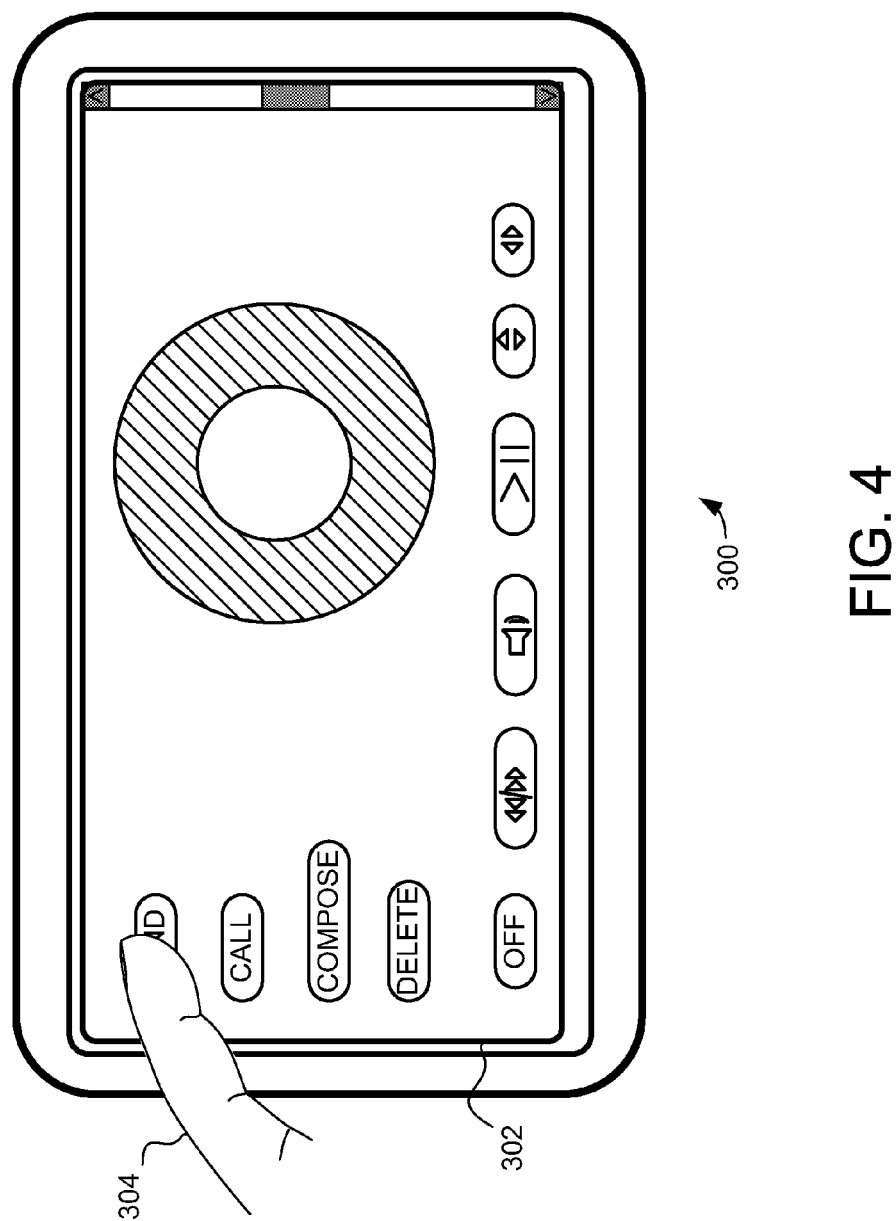

In accordance with the embodiments of the invention, the possibility of inadvertent activation of certain functions is reduced. Specifically, for certain functions the touch screen device and method uses the presence of a second object to confirm selection of a function before that function will be initiated and performed. Turning now to FIG. 4, the device 300 is illustrated with a first finger 304 placed in the sensing region over the "send" button. As the proximity sensor is configured to identify a selected function that corresponds to the location of an identified presence of a first object, the sensor identifies the "send" function responsive finger 304 being over the send button. It should also be noted that while fingers are illustrated in this exemplary embodiment as being used to select the function, that the touch screen 302 would typically be implemented to respond to a variety of different objects, including pointing devices such as styli and pens.

Figure 5:
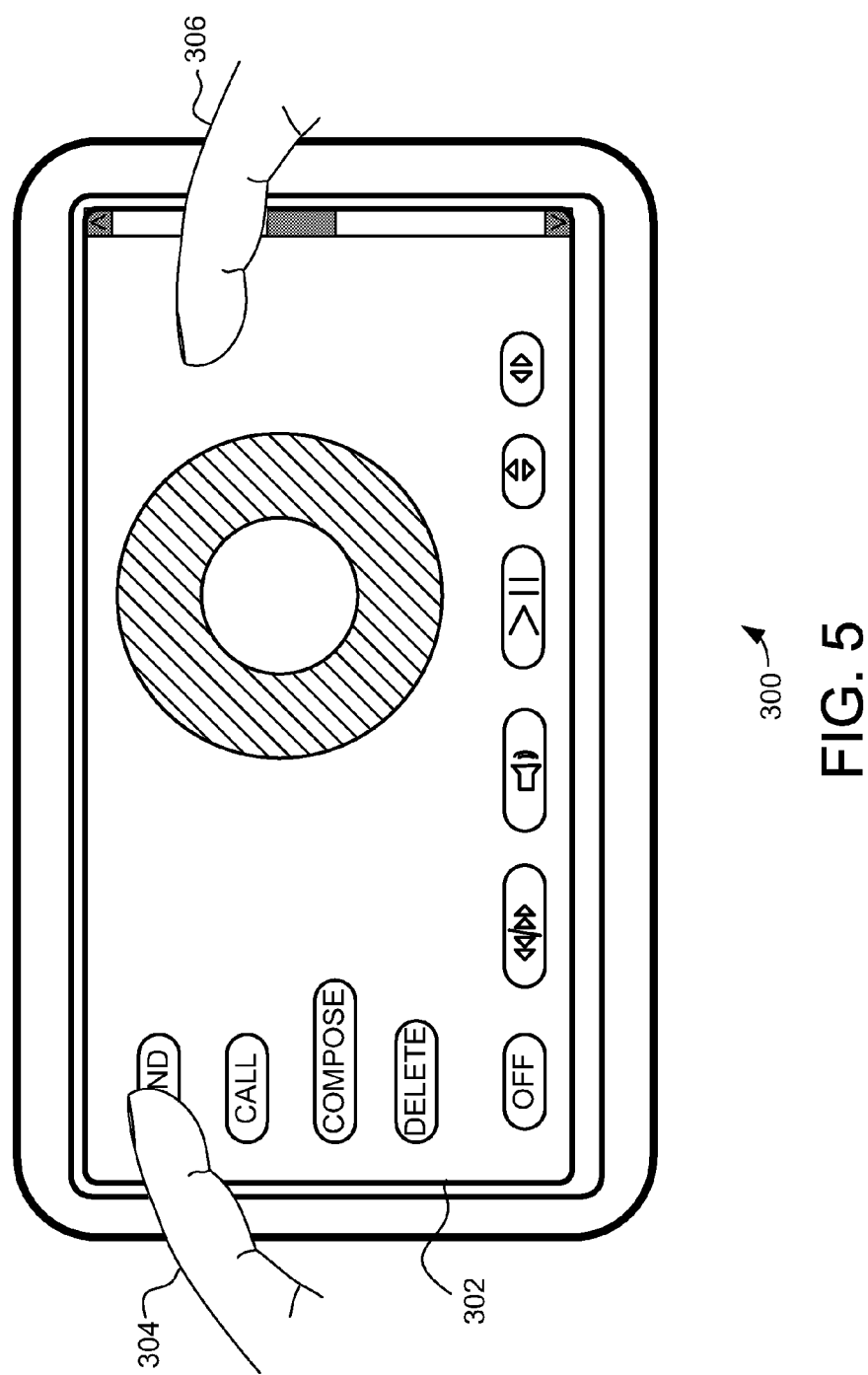

Turning now to FIG. 5, the device 300 is illustrated with a second finger 306 placed in the sensing region of the touch screen 302, while the first finger 304 remains on the send button. The proximity sensor is configured to confirm the selected function responsive to an identified presence of a second object in the sensing region within a specified temporal period of the identified presence of the first object. Thus, the presence of the second finger 306 is identified, and the selected "send" function is confirmed responsive to the identified presence of the second finger 306. Thus, the location of a first finger 304 identifies a function, and the presence of the second finger 306 confirms the selected function. Without the presence of the second finger 306 with the specified temporal period, the activation of the send function would not be confirmed and thus would not be performed. So configured, the touch screen 302 reduces the likelihood of inadvertent activation of the send function.

It should be noted that touch screen 302 can be configured to allow the placement of the second finger 306 in a variety of different places in the sensing region to confirm the selected function. For example, in some embodiments, the touch screen 302 can be configured to confirm the selected function regardless of the location of the identified presence of the second object in the sensing region. In this embodiment, the second finger can be placed anywhere in the sensing region to confirm the selected function. With the location of the second finger so unconstrained, the confirmation of the selected function remains an easy task for a user to perform. In other embodiments, the touch screen 302 can be configured to confirm the selected function only when the location of the identified presence of the second finger is within a specified area. For example, in any area that does not contain other user interface elements, or in an area specifically designated for confirming selected functions. In this embodiment, the selected function can still be confirmed relatively easily, although this embodiment requires more careful input from the user.

It should be noted that in the example of FIGS. 4 and 5, the identified presence of the second object begins after the identified presence of the first object begins. Thus, in this embodiment the second object presence begins after the identified presence of the first object begins, and the function that is selected is identified by the earlier object in the sensing region. However, in other embodiments the identified presence of the first object can begin after the identified presence of the second object begins. In those embodiments the first object presence begins after the second, and thus the function that is selected is identified by the location of the later object on the sensing region.

It should thus be understood that the "first" in "identified presence of a first object" and "second" in "identified presence of a second object" are used for convenience of explanation, and are not meant to imply any temporal or other order. For example, in some embodiments, the system may be implemented with a timeout that ignores objects sensed in the sensing region that remains substantially stationary for a set duration. In this case, the "first object" may actually be the Mth object in the sensing region in temporal order, and the "second object" may actually by the Nth object in the sensing region in temporal order, where M and N are unequal, whole numbers.

Figure 6:
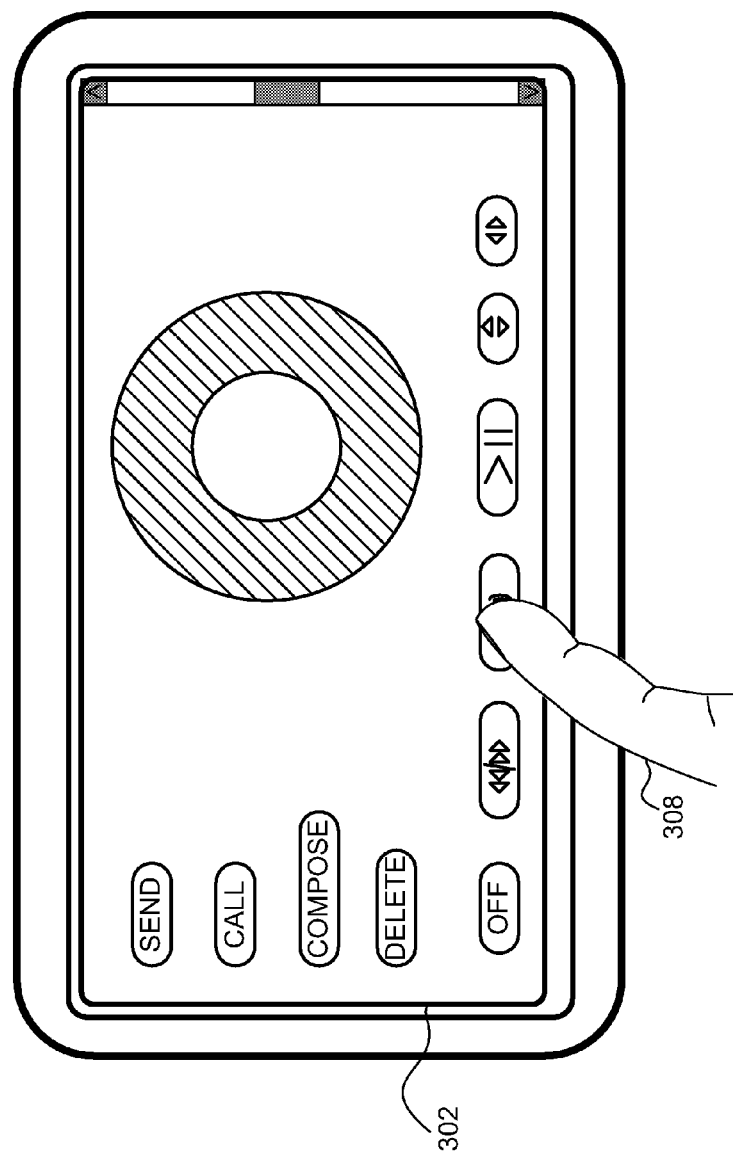

Turning now to FIG. 6, the electronic device 300 is now illustrated with a first finger 308 placed in the sensing region over the "volume" button. As the proximity sensor is configured to identify a selected function that corresponds to the location of an identified presence of a first object, the sensor identifies the "volume" function responsive finger 308 being over the volume button.

Figure 7:
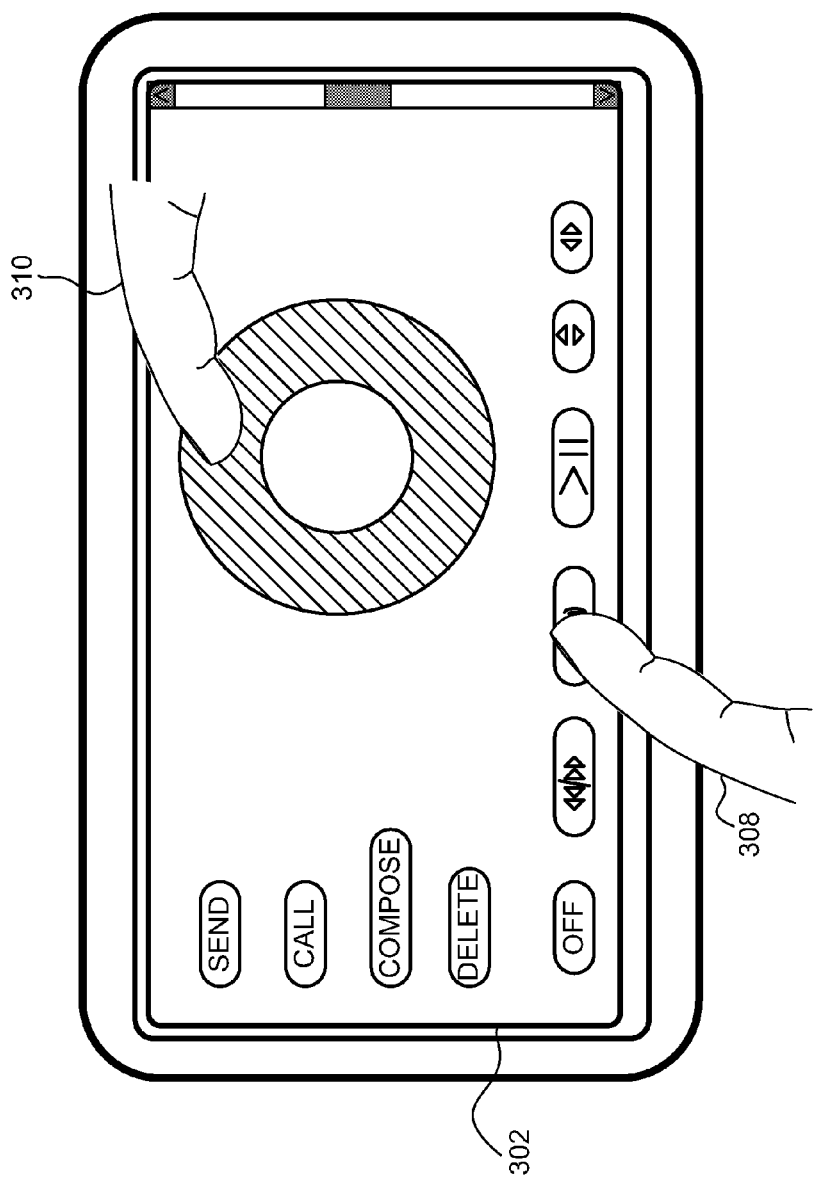

Turning now to FIG. 7, the device 300 is illustrated with a second finger 310 placed in the sensing region of the touch screen 302, while the first finger 308 remains on the volume button. The proximity sensor is configured to confirm the selected function responsive to an identified presence of a second object in the sensing region within a specified temporal period of the identified presence of the first object. Thus, the presence of the second finger 310 is identified, and the selected "volume" function is confirmed responsive to the identified presence of the second finger 310. Thus, the location of a first finger 308 identifies a function, and the presence of the second finger 310 confirms the selected function. Again, without the presence of the second finger 310 with the specified temporal period, the activation of the volume function would not be confirmed and thus would not be performed.

Figure 8:
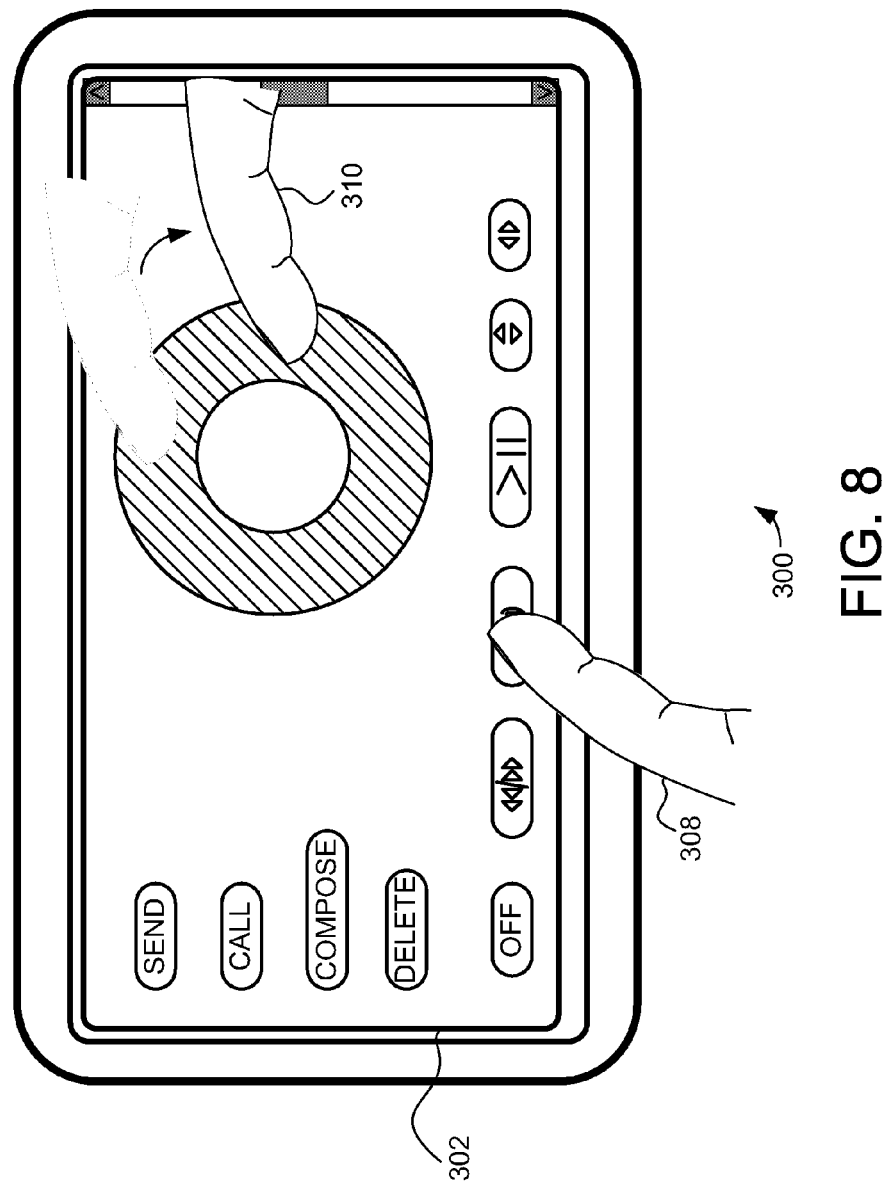

In this example, the volume function is an "adjustment" function, one where a parameter of the device changed according to the preference of a user. Thus, in addition to confirming the selected function, the second finger 310 can be used to adjust the parameter associated with the function. Turning now to FIG. 8, the device 300 is illustrated with the second finger 310 moving about the adjustment wheel. The proximity sensor is configured to indicate an adjustment relating to the selected function responsive to the motion of the second finger 310. Thus, the motion of the second finger 310 about the adjustment wheel, while the first finger 308 remains on the volume button, causes the volume of the device to be adjusted (e.g., increased or decreased, depending on the direction of motion about adjustment wheel).

It should be noted that touch screen 302 can be configured to allow the motion of the second finger to be a variety of different places in the sensing region to perform the adjustment related to the selected function. As illustrated in FIG. 7, in some embodiments the motion of the second object is required to be within a specified area, such as around a adjustment wheel or proximate a scroll bar. In other embodiments, the touch screen 302 can be implemented to facilitate adjustment regardless of where the motion occurs in the sensing region In this embodiment, the second finger can be placed and moved anywhere in the sensing region to perform the adjustment.

It will be desirable in some embodiments to require that the movement of the second object occur within a specified time period to effectuate an adjustment. This avoids the problem of later inadvertent object motion being misinterpreted to cause adjustment. For example, the touch screen 302 can be implemented to require that the motion of the second object occur within a specified time period of the beginning of the identified presence of the second object for the motion to be interpreted to cause adjustment. In a variation on this embodiment, motion of the first object in the sensing region occurring after the identified presence of the second object is used to cause adjustment.

In some cases it will be desirable to provide a specific mechanism for ending the performance of a function. As one example, for functions where later object motion is not used for "adjustment" related to the selected function, the system can respond to later movement of either object by ending the confirmation or performance of the function. Where object motion is required to perform the selected function, the system can respond to the movement of the object not supplying the object motion for adjustment by ending the confirmation or performance. In all cases, the retreat of either or both the first and second objects from the sensing region can trigger an end to the function confirmation or performance. There are myriad other ways that the system can be implemented to use for ending the function confirmation or performance, including recognizing actuating buttons, sensing additional input objects in the sensing region, determining that the first, second, or some other object has been placed in particular portions of the sensing region, noting object motion indicative of specific gestures, and so on.

Such methods to end the confirmation or performance of the selected function may be especially useful to "abort" without causing significant changes to the system. For example, removal of either or both the first and second objects within a set period of identification of the first and second objects can undo any changes due to identification and confirmation of the selected function, or undo any adjustment that may have occurred (or are about to occur if there is a time lag).

In another variation, object motion following a period where both the first and second objects are substantially stationary can be used to identify and adjust a function. In this embodiment, the touch screen interface is implemented to accept "dwelling" (objects sensed as substantially stationary in the sensing region) for identifying presences in the sensing region, and it is not required that the object presences not be preceded by lack of the associated objects in the sensing region. In this case, if both objects are in locations that are associated with functions, then there may be ambiguity. If the functions differ, then there may be ambiguity regarding which function should be identified and confirmed as the selected function. If the functions are the same, there may still be ambiguity regarding which object is the first object (that is associated with identifying the function), and which object is the second object (that is associated with confirming the function). One way to disambiguate is to use the order of arrival, where the earlier-object-to-arrive-and-dwell at a location associated with a function is the first object, and the later-object-to-arrive-and-dwell at a location associated with a function is the second object. Another way to disambiguate using the order of arrival is to do the reverse, and the earlier-object-to-arrive-and-dwell is the second object, and the later-object-to-arrive-and-dwell at a location is the first object.

However, if the objects arrive nearly simultaneously in locations associated with functions, then that initial order of arrival of the objects cannot be used to identify the selected function. In one embodiment, the system is configured to identify the selected function based in part on which object moves (or at least moves earlier) after that period of time when both objects were stationary. For example, the object that remains stationary or moves later can be considered the first object having the location that identifies the selected function, while the object that moves first can be considered the second object that confirms the selected function. As an alternative, the reverse can be done, and the objected that is sensed as earlier-to-move can be considered the first object and the object that is sensed as later-to-move (or does-not-move) can be considered the second object. In an embodiment where an adjustment-type function is selected, the object that is stationary (or is later-to-move) can be considered the first object that determines what function is activated, while the object that moves (or is earlier-to-move) can be considered the second object that performs an adjustment related to this function. For example, where locations in the sensing region above displayed function control elements are associated with those functions, and both objects were located on function control elements, the object that first moves adjusts the function corresponding to the control under the stationary object. Conversely, the system can be implemented to adjust the function that was associated with a previous, "dwell" location of the earlier-to-move object instead. In other cases, the movement of the object in the sensing region both selects the function to be activated and performs an adjustment relating to the selected function.

In some instances, the first object may "dwell" in a location associated with a function and the second object may "dwell" in a location not associated with any specific functions. In this case, the system can be implemented to confirm and perform the function associated with the first object only if the second object moves first. Alternatively, the system can be implemented to confirm and perform the function associated with the first object regardless of which object moves first.

Similarly to the above, in another variation, object motion following the substantially simultaneous appearance of the first and second objects in the sensing region can also be used to identify and adjust a function. In the case of substantially simultaneous appearance of the two objects, ambiguity may also result if both objects appear in locations corresponding to functions. Analogous ways to those described above to disambiguate overlapping "dwell" time can also be applied to disambiguate substantially simultaneous appearance.

Figure 9:
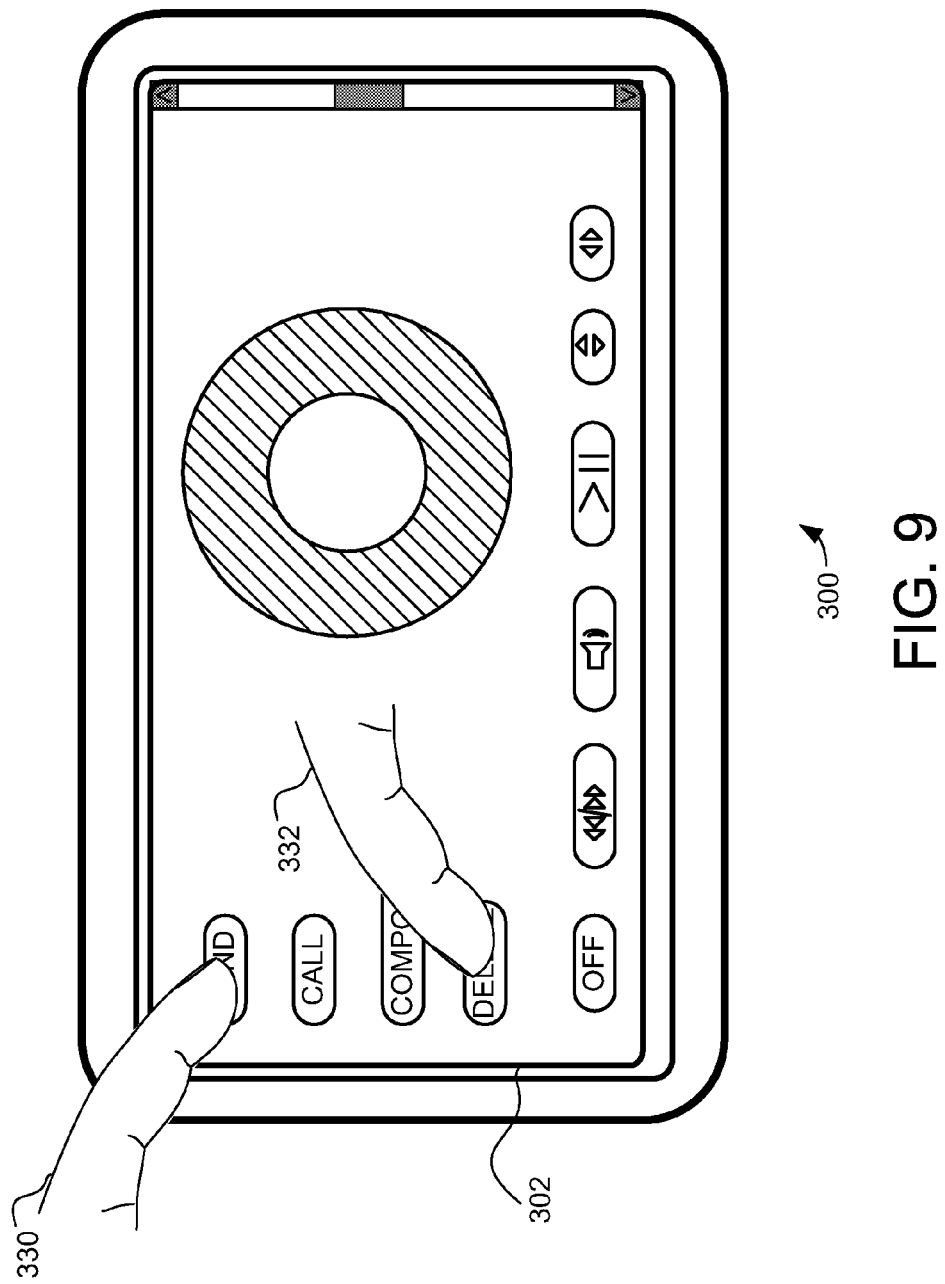

Turning now to FIG. 9, the device 300 is illustrated with the simultaneous appearance or dwelling of a first finger 330 and a second finger 332 on the touch screen 302. In this case, the first finger 330 is proximate the "send" function, while the second finger 332 is proximate the "delete" function. As stated above, the substantially simultaneous appearance or dwelling of the first finger 330 and the second finger 332 may result in ambiguity regarding which function is to be initiated. In this case, the subsequent motion of the one of the fingers can be used to identify which function is to be the selected function. Thus, the device could be implemented to identify the function proximate the stationary finger as the selected function, or it could be implemented to identify the function proximate the subsequently non-stationary finger as the selected function. The choice of which implementation to use can user configurable, or specified by the device provider.

Figure 10:
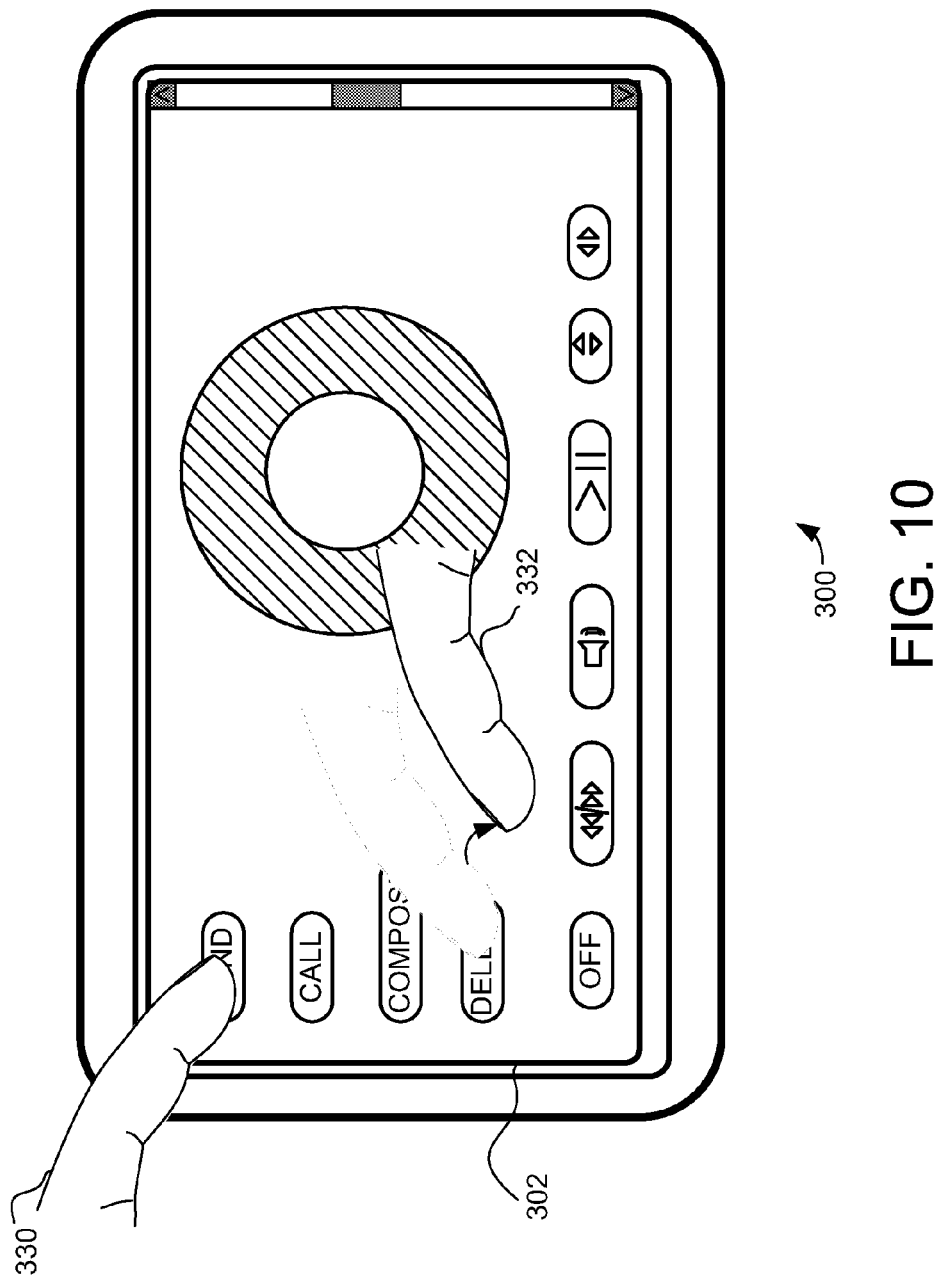

Turning now to FIG. 10, the device 300 is illustrated after the motion of the second finger 332. The device 300 can now confirm the "send" function responsive to the subsequent motion of the second finger 332. Conversely, the device 300 can be implemented to now confirm the "delete" function responsive to the subsequent motion of the second finger 332. In either case, the system resolves the potential ambiguity resulting from the simultaneous appearance or dwelling of two objects by monitoring for subsequent motion and using that motion to determine which function should be selected and confirmed.

The touch screen can be implemented to provide the ability for a user to easily cause a variety of different adjustments in the electronic system. For example, it can be used to facilitate user interface navigation, such as scrolling, panning, menu navigation, cursor control, and the like. As another example, it can be used to facilitate value adjustments, such as changing a device parameter, including visual parameters such as color, hue, brightness, and contrast, auditory parameters such as volume, pitch, and intensity, operation parameters such as speed and amplification. The touch screen can also be used for control of mechanical devices, such as in controlling the movement of a machine.

The embodiments of the present invention thus provide a touch screen device and method that facilitates improved device usability. Specifically, the touch screen device and method provide user interface functionality while reducing the possibility of inadvertent activation of certain functions. The touch screen device comprises a proximity sensor adapted to detect object presence in a sensing region, a display screen overlapped at least in part by the sensing region, and a processor. The touch screen device is adapted to provide user interface functionality by facilitating the display of user interface elements and the selection and activation of corresponding functions. For certain functions, the touch screen device and method uses the presence of a second object to confirm selection of a function before that function will be performed. So configured, the touch device screen is able to reduce the likelihood of inadvertent activation for certain functions on the device.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

What is claimed is:

1. A touch screen interface for an electronic device, the touch screen interface comprising:
    a display screen;
    a sensor proximate to the display screen, the sensor adapted to sense object presence in a sensing region, wherein the sensing region overlaps at least part of the display screen; and
    a processor, the processor coupled to the sensor, the processor configured to:
        responsive to an identified presence of a first object in the sensing region, identify a selected function that corresponds to a location of the first object in the sensing region; and
        responsive to an identified presence of a second object in the sensing region within a specified temporal period that overlaps with the identified presence of the first object in the sensing region, confirm the selected function.

2. The touch screen interface of claim 1 wherein the processor is configured such that, for the identified presence of the second object to be within the specified temporal period that overlaps with the identified presence of the first object, the identified presence of the second object must begin after the identified presence of the first object begins, and the identified presence of the second object must temporally overlap with the identified presence of the first object.

3. The touch screen interface of claim 1 wherein the processor is configured such that, for the identified presence of the second object to be within the specified temporal period that overlaps with the identified presence of the first object, the identified presence of the first object must begin after the identified presence of the second object begins, and the identified presence of the first object must temporally overlap with the identified presence of the second object.

4. The touch screen interface of claim 1 wherein the processor is further configured to indicate adjustment relating to the selected function responsive to motion of the second object in the sensing region occurring after the identified presence of the second object in the sensing region.

5. The touch screen interface of claim 4 wherein the processor is configured to indicate adjustment responsive to said motion of the second object in the sensing region occurring within a specified time period of a beginning of the identified presence of a second object in the sensing region.

6. The touch screen interface of claim 4 wherein the selected function is selected from a group consisting of scrolling, zooming, panning and rotating.

7. The touch screen interface of claim 1 wherein the selected function is a button function.

8. The touch screen interface of claim 1 wherein the processor is further configured to indicate adjustment relating to the selected function responsive to motion of the first object in the sensing region occurring after the processor confirms the selected function.

9. The touch screen interface of claim 1 wherein the processor is further configured to identify a substantially simultaneous appearance of two objects in the sensing region, and wherein the processor is configured to select a substantially stationary object in the two objects as the first object and a select a substantially non-stationary object in the two objects as the second object.

10. The touch screen interface of claim 1 wherein the processor is further configured to confirm the selected function responsive to the identified presence of the second object in the sensing region regardless of a location of the identified presence of the second object in the sensing region.

11. The touch screen interface of claim 1 wherein the processor is further configured to indicate adjustment relating to the selected function responsive to motion of the second object in the sensing region regardless of location of the motion of the second object in the sensing region.

12. A touch screen interface for an electronic device, the touch screen interface comprising:
a display screen configured to display a plurality of icons, each icon identifying a location on the touch screen interface corresponding to a function on the electronic device;
a capacitive sensor proximate to the display screen, the capacitive sensor adapted to sense object presence in a sensing region, wherein the sensing region overlaps at least part of the display screen; and
a processor, the processor coupled to the sensor, the processor configured to:
responsive to an identified presence of a first object in the sensing region, identify a selected function that corresponds to an icon in the plurality of icons that is proximate a location of the first object in the sensing region; and
responsive to an identified presence of a second object in the sensing region beginning both after the identified presence of the first object begins, and before the identified presence of the first object ends, confirm the selected function regardless of a location of the identified presence of the second object in sensing region.

13. The touch screen interface of claim 12 wherein the processor is further configured to, responsive to motion of the second object in the sensing region after the identified presence of the second object in the sensing region, indicate adjustment relating to the selected function responsive to motion of the second object in the sensing region.

14. A method for indicating a function on a touch screen, the method comprising:
monitoring electrical signals with a processor for indicia of object presence in a sensing region provided by the touch screen;
responsive to an identified presence of a first object in the sensing region, identify a selected function that corresponds to a location of the first object in the sensing region; and
responsive to an identified presence of a second object in the sensing region within a specified temporal period that overlaps with the identified presence of the first object in the sensing region, confirm the selected function.

15. The method of claim 14 wherein, for the identified presence of the second object to be within the specified temporal period that overlaps with the identified presence of the first object, the identified presence of the second object must begin after the identified presence of the first object begins, and the identified presence of the second object must temporally overlap with the identified presence of the first object.

16. The method of claim 14 wherein, for the identified presence of the second object to be within the specified temporal period that overlaps with the identified presence of the first object, the identified presence of the first object must begin after the identified presence of the second object begins, and the identified presence of the first object must temporally overlap with the identified presence of the second object.

17. The method of claim 14 further comprising the step of indicating adjustment relating to the selected function responsive to motion of the second object in the sensing region occurring after the identified presence of the second object in the sensing region.

18. The method of claim 17 wherein the step of indicating adjustment relating to the selected function comprises indicating adjustment responsive to said motion of the second object in the sensing region occurring within a specified time period of a beginning of the identified presence of a second object in the sensing region.

19. The method of claim 17 wherein the selected function is selected from a group consisting of scrolling, zooming, panning and rotating.

20. The method of claim 14 wherein the selected function is a button function.

21. The method of claim 14 further comprising the step of indicating adjustment relating to the selected function responsive to motion of the first object in the sensing region occurring after the identified presence of a second object in the sensing region.

22. The method of claim 14 further comprising the step of identifying a substantially simultaneous appearance of two objects in the sensing region, and further comprising the step of selecting a substantially stationary object in the two objects as the first object and a selecting a substantially non-stationary object in the two objects as the second object.

23. The method of claim 14 wherein the step of confirming the selected function is performed regardless of a location of the identified presence of the second object in the sensing.

24. The method of claim 17 wherein the step indicating adjustment relating to the selected function responsive to motion of the first object in the sensing region is performed regardless of a location of the motion of the first object in sensing region.

25. A program product comprising:
a) a sensor program, the sensor program adapted to;
responsive to an identified presence of a first object in a sensing region of a touch screen, identify a selected function that corresponds to a location of the first object in the sensing region;
responsive to an identified presence of a second object in the sensing region within a specified temporal period that overlaps with the identified presence of the first object in the sensing region, confirm the selected function; and
b) non-transitory computer-readable media bearing said sensor program.

26. A touch screen interface for an electronic device, the touch screen interface comprising:
a display screen;
a sensor proximate to the display screen, the sensor adapted to sense object presence in a sensing region, wherein the sensing region overlaps at least part of the display screen; and
a processor, the processor coupled to the sensor, the processor configured to:
responsive to an identified presence of a first object in the sensing region simultaneously occurring with an identified presence of a second object in the sensing region, and after a beginning of a motion of either the first or the second object, identify a selected function that corresponds to a location of one of the first and second objects;
responsive to the motion of the either the first or the second object, indicate an adjustment relating the selected function.

27. The touch screen interface of claim 26, wherein the location of one of the first and second objects is a location of whichever of the first and the second object that is nonstationary in the sensing region.

28. The touch screen interface of claim 26, wherein the location of one of the first and second objects is a location of whichever of the first object and the second object is stationary in the sensing region.

* * * * *